United States Patent
Mothfar (10) Patent No.: US 9,612,026 B2
(45) Date of Patent: Apr. 4, 2017

(54) PORTABLE EVAPORATIVE COOLER FOR VEHICLES

(71) Applicant: Ahmad Younis Mothfar, Ali Sabah Al-Salem (KW)

(72) Inventor: Ahmad Younis Mothfar, Ali Sabah Al-Salem (KW)

( * ) Notice: Subject to any disclaimer, the term of this patent is extended or adjusted under 35 U.S.C. 154(b) by 0 days.

(21) Appl. No.: 14/706,938

(22) Filed: May 7, 2015

(65) Prior Publication Data

US 2016/0327289 A1 Nov. 10, 2016

(51) Int. Cl.
*F28D 3/00* (2006.01)
*F24F 5/00* (2006.01)
*F24F 6/14* (2006.01)
*B60H 1/32* (2006.01)

(52) U.S. Cl.
CPC ......... *F24F 5/0035* (2013.01); *B60H 1/3202* (2013.01); *F24F 6/14* (2013.01)

(58) Field of Classification Search
CPC ........ F24F 6/14; F24F 2221/12; F24F 5/0035; F24F 1/007; F24F 2001/0085; F24F 2001/0088; F24F 1/002; F24F 6/02; B60H 3/022; B60H 3/02; B60H 1/3202; B60H 2003/026; B60H 1/00357; B60H 2001/00235
USPC .................................... 62/171; 454/142, 157
See application file for complete search history.

(56) References Cited

U.S. PATENT DOCUMENTS

| 2,774,581 A | * | 12/1956 | Bowersox | B60H 1/3202 261/24 |
| 2,796,014 A | * | 6/1957 | Montgomery | B60H 1/3202 261/158 |
| 2,608,711 A | | 10/1957 | Garces | |
| 2,983,212 A | * | 5/1961 | Poole | B60H 1/3202 261/97 |
| 4,373,346 A | * | 2/1983 | Hebert | F25B 29/003 62/160 |
| 4,658,597 A | | 4/1987 | Shum | |
| 4,953,831 A | * | 9/1990 | Albrecht | B60H 1/3202 261/102 |
| 5,285,654 A | * | 2/1994 | Ferdows | B60H 1/00371 261/103 |
| 5,373,703 A | | 12/1994 | Pal | |

(Continued)

FOREIGN PATENT DOCUMENTS

GB 2 241 378 A 8/1991

*Primary Examiner* — Elizabeth Martin
(74) *Attorney, Agent, or Firm* — Richard C. Litman (57) ABSTRACT

The portable evaporative cooler for vehicles includes a housing with a hanging hook and suction cups for selective mounting to a side window of a vehicle. The housing is divided into various interior compartments for an airflow manifold, a misting assembly, and a heat exchange system. The airflow manifold includes a fan that positively feeds ambient air through a first heat exchanger to pre-cool the air prior to subjecting the same to a moisture mist from the misting assembly for further cooling. The cooled air flows through a second heat exchanger for final cooling prior to exiting the housing and into the interior of the vehicle. The fan forces airflow in one direction to recycle the ambient air through the housing. A controller is coupled to a temperature sensor and a humidity sensor to monitor the air and control the components to cool the air to desired or predetermined levels.

15 Claims, 5 Drawing Sheets

(56) References Cited

U.S. PATENT DOCUMENTS

| | | | | |
|---|---|---|---|---|
| 5,569,076 A | * | 10/1996 | Sudak | B60H 1/3435 |
| | | | | 454/155 |
| 5,873,256 A | * | 2/1999 | Denniston | B60H 1/00414 |
| | | | | 62/244 |
| 6,112,538 A | | 9/2000 | Strussion | |
| 6,202,429 B1 | * | 3/2001 | Kinkel | F24F 1/022 |
| | | | | 165/225 |
| 6,422,030 B1 | * | 7/2002 | Calvert | F24F 5/0035 |
| | | | | 62/310 |
| 2002/0078704 A1 | * | 6/2002 | Stich | B60H 1/3202 |
| | | | | 62/310 |
| 2007/0089448 A1 | | 4/2007 | Critchfield | |
| 2007/0163772 A1 | * | 7/2007 | Bhatti | F28F 1/126 |
| | | | | 165/202 |
| 2015/0013372 A1 | * | 1/2015 | Harke | B60H 1/28 |
| | | | | 62/291 |

\* cited by examiner

PORTABLE EVAPORATIVE COOLER FOR VEHICLES

BACKGROUND OF THE INVENTION

1. Field of the Invention

The present invention relates to air conditioning systems, and particularly to a portable evaporative cooler for vehicles that provides faster cooling to a vehicle interior.

2. Description of the Related Art

A comfortable driving environment is highly desired by many would-be travelers. Air conditioning systems in most modern vehicles have provided everyone with a greater ability to control the ambient temperatures of their surroundings with relative ease.

While great advancements have been made to cool the interior of vehicles, especially during the relatively hot months of the year, the current air conditioning systems are still limited by the thermodynamic conditions of the interior. Depending on how hot the interior of the vehicle becomes, it requires greater energy to cool the interior the greater the temperature difference between ambient and the desired temperatures.

Such requirements usually results in longer time needed to cool the interior to the desired level even though current air conditioning systems are very efficient. This trend may not be an ordeal to some who have the patience and the tolerance to wait, but if the interior temperature is too high, the wait time may be longer than desired or quickly becomes an uncomfortable or unbearable situation.

Many who live and travel in temperate areas of the world do not experience much difficulty with this type of condition. However, those who live in arid climates such as the Middle East experience temperature extremes to a much greater degree. Moreover, there are many vehicles in service that do not have an air conditioner.

In light of the above, it would be a benefit in the art of temperature control to provide some means to more quickly cool the interior of vehicles. Thus, a portable evaporative cooler for vehicles solving the aforementioned problems is desired.

SUMMARY OF THE INVENTION

The portable evaporative cooler for vehicles includes a housing with a hanging hook and suction cups for selective mounting to a side window of a vehicle. The housing is divided into various interior compartments for an airflow manifold, a misting assembly, and a heat exchange system. The airflow manifold includes a fan that positively feeds ambient air through a first heat exchanger to pre-cool the air prior to subjecting the same to a moisture mist from the misting assembly for further cooling. The cooled air flows through a second heat exchanger for final cooling prior to exiting the housing and into the interior of the vehicle. The fan forces airflow in one direction to recycle the ambient air through the housing. A controller is coupled to a temperature sensor and a humidity sensor to monitor the air and control the components to cool the air to desired or predetermined levels.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The portable evaporative cooler for vehicles, generally referred to by the reference number 10 in the drawings, provides relatively fast cooling of a vehicle interior as a supplemental cooling system to existing air conditioning systems or as a standalone cooling unit. As best seen in FIGS. 1-4, the portable evaporative cooler 10 includes a substantially hollow housing 12 constructed to hold internal components therein. The housing 12 is preferably a generally rectangular box with at least two different mounting assemblies for securing the portable evaporative cooler 10 inside the vehicle. These mounting assemblies include one or more suction cups 15 mounted to the back 14 of the housing 12 and an elongate mounting hook 16 extending from and along the top rear corner of the housing 12. At least one of the sides of the housing such as a side panel 17 can be removed to gain access to the interior of the housing for servicing and maintenance.

In use, the user can employ the mounting hook 16 to hang the portable evaporative cooler 10 around a top edge of planar object such as a side window in most vehicles. The weight of the portable evaporative cooler 10 as well as the length of the hooked extension of the mounting hook 16 may be sufficient to secure the portable evaporative cooler 10 onto the window. However, the user can also vacuum-mount the housing 12 against the inner surface of the window via the suction cups 15 to secure the mounting of the portable evaporative cooler 10. Though the portable evaporative cooler 10 has been described for use with vehicles, it is also contemplated that the portable evaporative cooler 10 can be used and mounted anywhere that allows for vacuum-mounting and/or hook-mounting of the housing 12.

Figure 1:
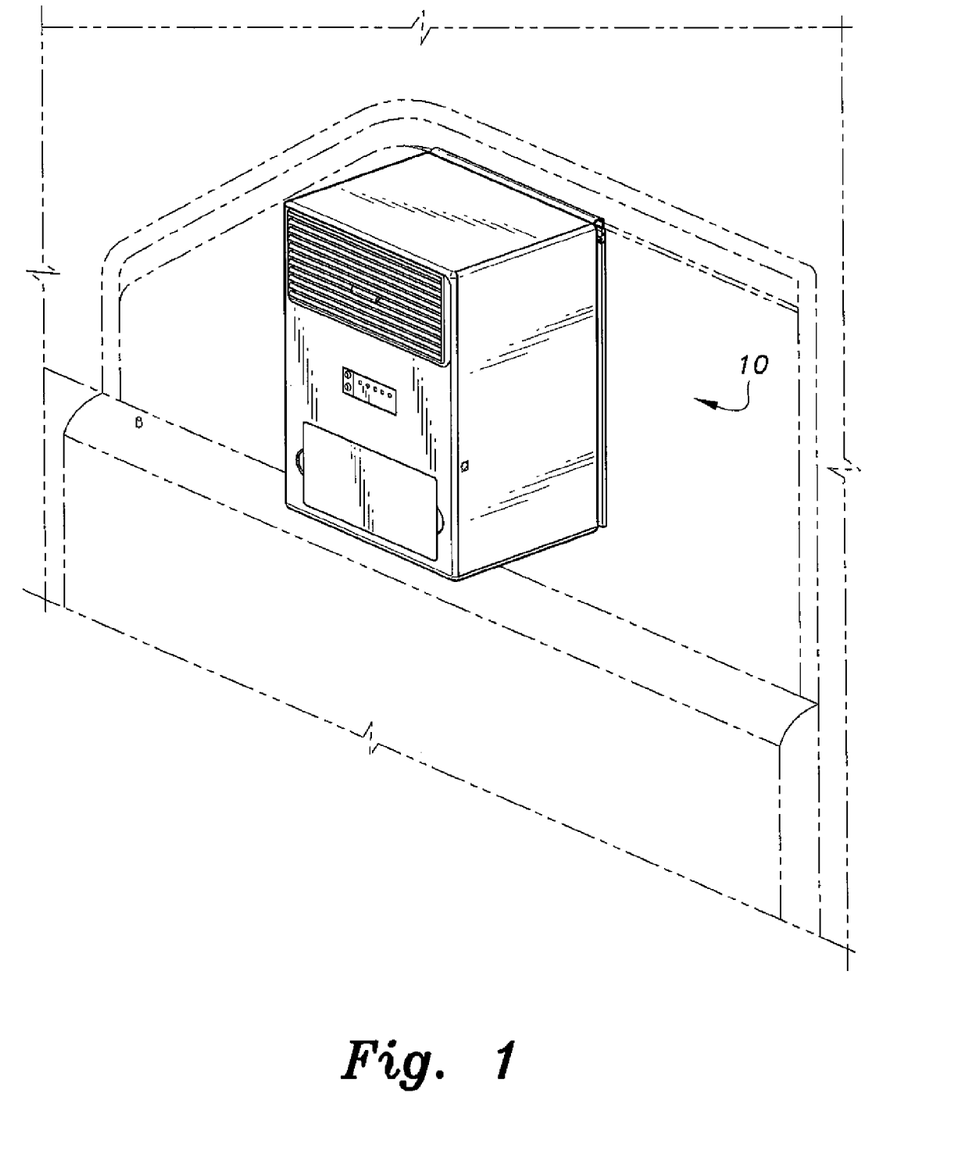
FIG. 1 is an environmental, perspective view of a portable evaporative cooler for vehicles according to the present invention.
Figure 2:
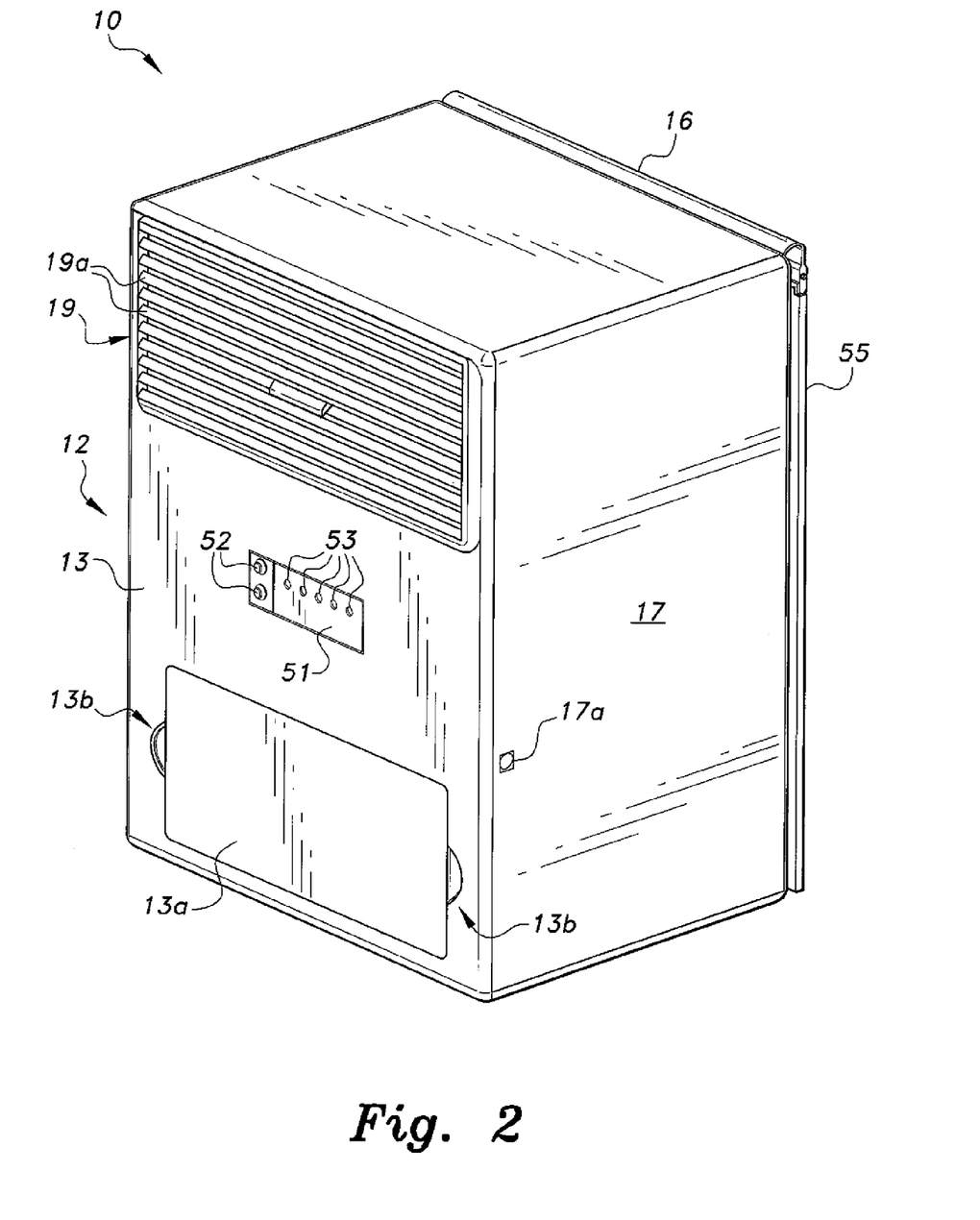
FIG. 2 is a perspective view of the portable evaporative cooler for vehicles shown in FIG. 1.
Figure 3:
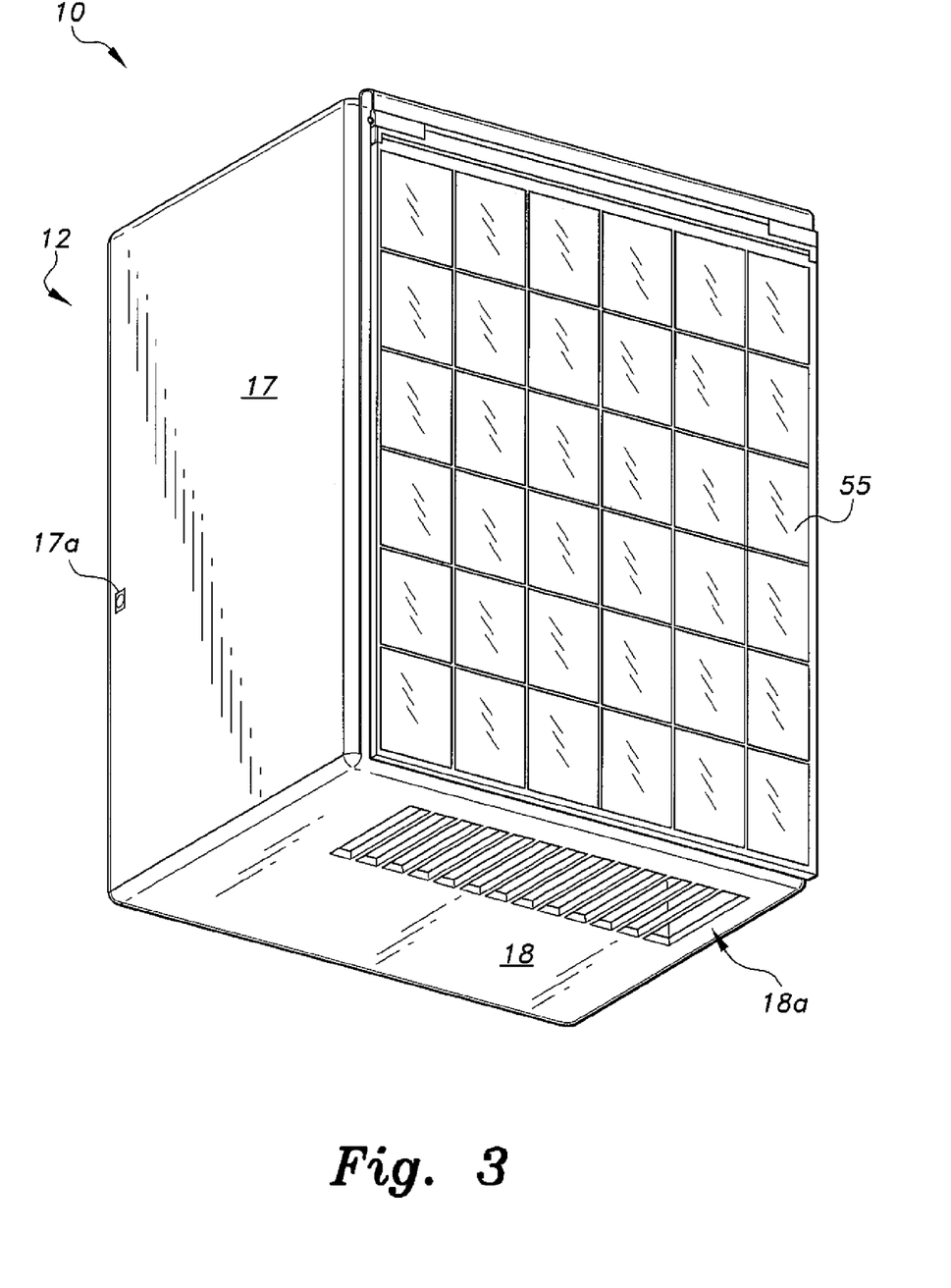
FIG. 3 is a rear perspective view of the portable evaporative cooler for vehicles shown in FIG. 1.
Figure 4:
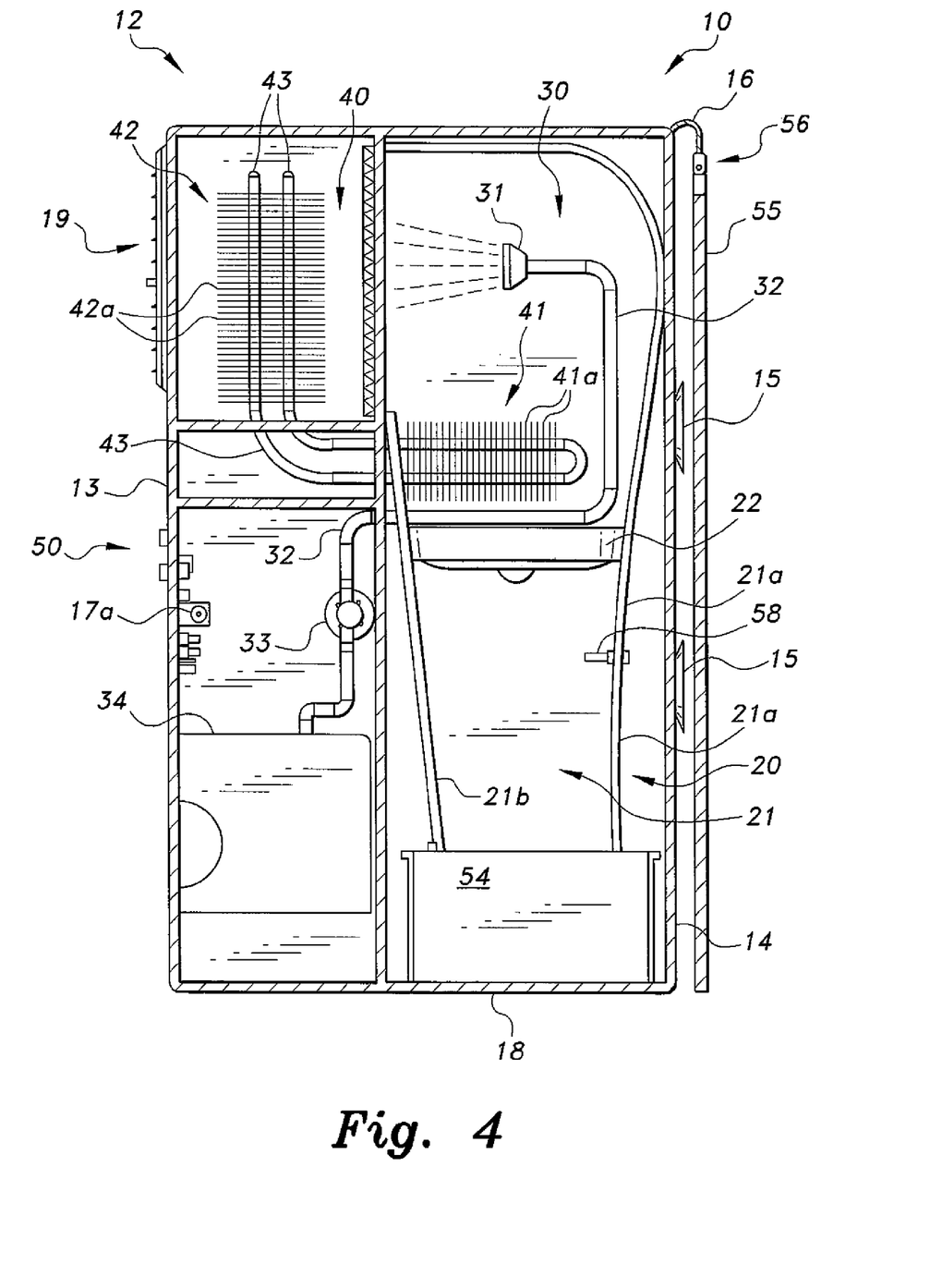
FIG. 4 is a sectional view of the portable evaporative cooler for vehicles shown in FIG. 1.
Figure 5A:
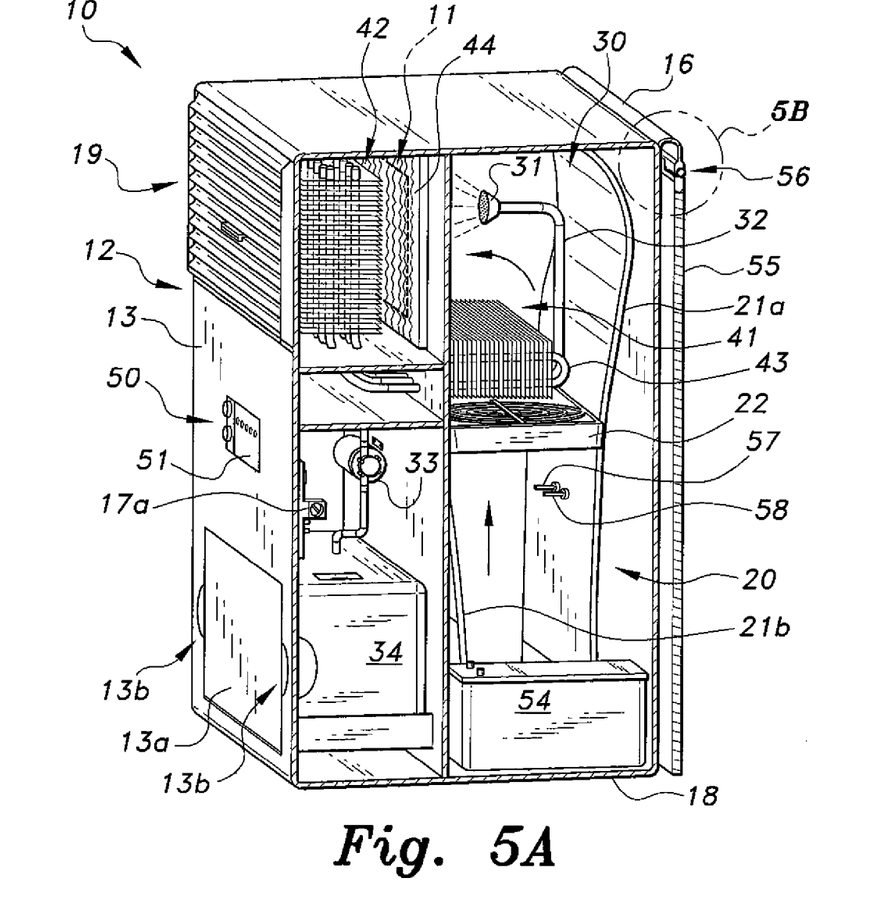
FIG. 5A is a cutaway perspective view of the portable evaporative cooler for vehicles shown in FIG. 1 with a side panel removed for clarity.

The portable evaporative cooler 10 facilitates supplemental cooling by passing the ambient air through a wet mist or vapor. As best seen in FIGS. 4 and 5A, the portable evaporative cooler 10 includes an airflow assembly 20 to direct ambient air through the interior of the housing 12, a misting assembly 30 to introduce water vapor into the airflow for evaporation and cooling, a heat exchange system 40 to cool the ambient air and wet air, and a controller 50 to selectively control various operations in the portable evaporative cooler 10. The interior of the housing 12 is divided into various sections and compartments so as to separate some of the internal components and enable controlled airflow and cooling through the portable evaporative cooler 10.

The airflow assembly 20 is provided with an airflow manifold 21 mounted within the rear compartment of the housing 12. The airflow manifold 21 defines the airflow path and directs ambient air from bottom air vent 18a provided on the bottom 18 of the housing 12 through the misting assembly 30, the bottom air vent 18a serving as an inlet for the airflow assembly 20. A fan 22 is disposed at about midway height within the manifold 21 to generate positive airflow through the manifold 21. The airflow manifold 21 is preferably constructed from a pair of first and second plates 21a and 21b with the first plate 21a being curvilinear to define an airflow path starting from the inlet and curving perpendicularly near the top of the interior of the housing 12 towards an opening 11 in the vertical partition dividing the front and rear interior sections. The second plate 21b is generally straight and extends from the inlet towards the misting assembly 30. Thus, the first plate 21a and the second plate 21b define a channel for the airflow path.

The air is subjected to different forms of cooling during the air's passage through the housing 12, and in an embodiment, the portable evaporative cooler 10 employs a three-stage process, which are provided by the misting assembly 30 and the heat exchanger 40. As best seen in FIG. 4, the misting assembly 30 includes a spray nozzle 31 coupled to a pipe 32. The spray nozzle 31 is disposed near the upper portion of the rear compartment and oriented so as to direct the spray towards an outlet or outlet vent 19 of the housing 12. The pipe 32 extends from the spray nozzle 31 down through the partition between the front and rear compartments and into a fluid tank 34 at the bottom front compartment of the housing 12. A pump 33 selectively feeds fluid from the tank 34 through the spray nozzle 31. The fluid tank 34 is normally filled with water. However, scented or perfumed water and other evaporative fluids can be used to provide a pleasant fragrance to the discharging cooled air. The housing 12 includes a removable or pivotable tank access panel 13a on the front 13 of the housing 12 to enable refilling of the fluid tank 34 by the user when needed. The front 13 can also include a pair of finger access grooves or cutouts 13b to ease removal of the tank access panel 13a.

The interior front section of the housing 12 is preferably divided into three compartments, an upper front compartment, a middle front compartment, and a bottom front compartment. The previously described pump 33, fluid tank 34, and a portion of the pipe 32 are located in the bottom front compartment, and the heat exchange system 40 spans the upper portion of the rear compartment through the middle and upper front compartments as shown in the drawings.

The heat exchange system 40 includes a first heat sink or heat exchanger 41 placed above the fan 22 or downstream of the airflow from the fan 22. A second heat sink or heat exchanger 42 is placed in the upper front compartment. Each heat exchanger 41 and 42 includes a plurality of respective first heat fins 41a and second heat fins 42b that provide increased surface area for efficient thermodynamic heat exchange to the medium flowing past the heat exchangers 41 and 42. A plurality of heat exchange pipes or rods 43 threads through the first and second heat fins 41a, 41b interconnecting the first heat exchanger 41 to the second heat exchanger 42. The heat exchange pipes 43 also enable a thermodynamic connection between the heat exchangers 41 and 42 so as to facilitate heat exchange between the two.

The heat exchange system 40 is preferably constructed from materials that provide enhanced thermal conductivity such as copper. Since the heat fins 41a, 42a and the heat exchange pipes 43 will be exposed to moisture from the sprayed fluid during operation, potential corrosion can be a concern. However, copper and most copper alloys tend to be relatively corrosion resistant and durable for this working environment. Other examples of suitable thermal conductive materials for the heat exchange system 40 include aluminum, carbon steel, stainless steel, nickel alloys, and titanium.

In use, the first heat exchanger 41 pre-cools the ambient air positively flowing through the first heat exchanger 41 by the fan 22. The pre-cooled air is subjected to wetting or moistening by the mist ejected from the spray nozzle 31 which further cools the pre-cooled air. The pump 33 can be operated at variable select intervals or continuously to facilitate corresponding bursts of mist sprays or a continuous mist spray through the spray nozzle 31. As best seen in FIG. 5A, a layer of absorbent material or absorbent layer 44 is placed over the opening 11 to absorb some of the excess moisture from the air and fluid mixture flowing through the opening 11. The absorbent layer 44 assists in regulating the cooling by insuring that at least some moisture is introduced into the airflow as long as there is moisture in the absorbent layer 44. The moist air then passes through the second heat exchanger 42 to be further cooled prior to discharge through the outlet vent 19. The moist air exiting the outlet vent 19 cools the interior of the vehicle through evaporation. The outlet vent 19 can be provided with a plurality of pivotable vanes 19a for the user to adjust the direction of the exiting airflow.

The fan 22 and the airflow manifold 21 are constructed to direct air in one direction. During operation, the ambient air is recycled by the one-way flow facilitating cooling of the vehicle interior either alone or in combination with the existing air conditioning system. In the case of the latter, the portable evaporative cooler 10 cools the interior faster by providing supplementary cooling.

The operation of the portable evaporative cooler 10 is controlled by the controller 50. The controller 50 includes a panel 51 with a plurality of buttons or activators 52 and a plurality of indicator lights 53. Some examples of the functions of the buttons 52 include power ON/OFF and selective operation of the misting assembly 30.

Figure 5B:
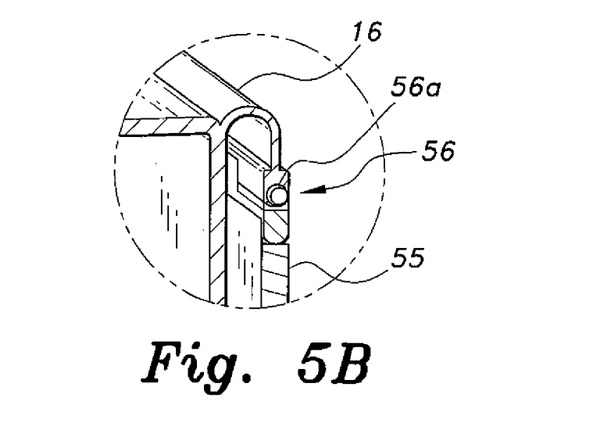
FIG. 5B is a detailed view of a hinge assembly on the portable evaporative cooler for vehicles shown in FIG. 1.

The controller 50 is coupled to a power source such as a rechargeable battery 54. In an embodiment, the battery 54 can be placed at the bottom of the rear compartment section next to the airflow manifold 21. The battery 54 can be recharged from an external power source such as an electric socket inside the vehicle or a power outlet from a domicile, and a charging port 17a can be provided on one side panels of the housing 12 such as the side panel 17. The portable evaporative cooler 10 can also be provided with an auxiliary power source such as a solar panel 55 pivotally coupled to a removable hinge 56 between the mounting hook 16 and the solar panel 55 as best seen in FIG. 5B. The removable hinge 56 can include a release button 56a to selectively disengage the solar panel 55 from the hinged connection to the mounting hook 16 so as to facilitate placement of the solar panel 55 at a desired location for maximal exposure.

The indicators lights 53 are preferably light emitting diodes (LEDs) that provide visual cues on the various operations of the portable evaporative cooler 10. For example, each indicator light 53 can illuminate in response to one of various monitoring states or conditions such as the charging status of the battery 54, a low battery power status, a high temperature status, and a high humidity status. Though not shown, each button 52 and indicator light 53 can be provided with respective indicia that details the specific function of the buttons 52 and the monitoring states of the indicator lights 53.

The controller 50 is also provided with at least a pair of sensors, a temperature sensor 57 and a humidity sensor 58, in operative communication with the panel 51 via transmission lines (not shown) in a manner know in the art. Other electro-mechanical components such as the fan 22, the pump 33, and the solar panel 55 are also similarly connected so as to facilitate selective operation thereof from the controller 50. The temperature sensor 57 and the humidity sensor 58 are preferably mounted inside the airflow manifold 21 between the inlet or bottom air vent 18*a* and the fan 22, the location being an optimal detection point for measuring the temperature and humidity of the incoming ambient air.

The controller 50 is configured so that when a predetermined high temperature is detected by the temperature sensor 57, which also activates a corresponding indicator light 53, the misting assembly 30 is operated by the controller 50 to increase the misting rate. Similarly, when a predetermined high humidity is detected by the humidity sensor 58, which also activates a corresponding indicator light 53, the misting from the misting assembly 30 is stopped until the humidity of the ambient air falls below the predetermined high humidity level. In this manner, the cooling is automatically maintained at predetermined levels with assistance from the sensors 57 and 58.

It is to be understood that the portable evaporative cooler 10 encompasses a variety of alternatives. For example, the housing 12 is preferably constructed from lightweight durable materials such as plastic, aluminum, composites, and combinations thereof that exhibit a degree of corrosion resistance due to the moist working environment. Moreover, various solutions of unscented, scented, or perfumed fluids can be used as the misting fluid as long as they provide suitable cooling through the misting assembly 30. Furthermore, the portable evaporative cooler 10 can be provided with a discrete handle to ease and/or increase portability for the user.

It is to be understood that the present invention is not limited to the embodiments described above, but encompasses any and all embodiments within the scope of the following claims.

I claim:

1. An evaporative cooler for vehicles, comprising:
   a housing, the housing having a front, a back, opposite sides, a top, and a bottom, an inlet disposed in the bottom for introducing ambient air into the housing, and an outlet disposed in the front for expelling cooled air;
   wherein the top, bottom, opposite sides, front, and back define an interior that is substantially hollow;
   a mounting assembly for vertically securing the housing onto a planar object;
   wherein the mounting assembly is adjacent to the back of the housing;
   a manifold mounted in the interior of the housing for directing airflow from the inlet toward the outlet;
   a fan disposed within the manifold for selectively inducing the airflow in a unitary direction from the inlet to the outlet;
   a first heat exchange member mounted in the manifold between the inlet and the outlet at a first position for cooling the ambient air;
   a misting assembly mounted in the interior of the housing, and having a nozzle disposed in the manifold between the inlet and the outlet;
   wherein the misting assembly sprays a fine mist of fluid into the airflow to moisten and cool the ambient air, and form a mixture of ambient air and fluid;
   a second heat exchange member mounted between the inlet and the outlet at a second position, the second heat exchange member cooling the mixture;
   a control panel mounted to the housing, the control panel providing powering and controlling operations of the evaporative cooler;
   wherein the housing is disposed within an interior of a vehicle by the mounting assembly; and
   at least one heat exchange pipe;
   wherein the first heat exchange member being disposed downstream of the fan, pre-cools the ambient air prior to subjecting the ambient air to the mist from the misting assembly;
   wherein the second heat exchange member being disposed downstream from the misting assembly, cools the mixture of ambient air and fluid prior to the mixture exiting the outlet; and
   wherein the at least one heat exchange pipe extending between the first heat exchange member and the second heat exchange member to interconnect the first heat exchange member to the second heat exchange member and facilitate heat transfer therebetween.

2. The portable evaporative cooler for vehicles according to claim 1 wherein the inlet comprises a vent disposed on the bottom of the housing.

3. The portable evaporative cooler for vehicles according to claim 1 wherein the outlet comprises a vent disposed on the front of the housing, the vent having a plurality of pivotable vanes to adjust direction of airflow through the vent.

4. The portable evaporative cooler for vehicles according to claim 1 wherein the mounting assembly comprises an elongate hanging hook extending along a corner defined between the top and the back of the housing, the hanging hook facilitating hanging of the housing over a top edge of the planar object.

5. The portable evaporative cooler for vehicles according to claim 4, wherein the mounting assembly further comprises at least one suction cup mounted to the back of the housing, the at least one suction cup securing the housing onto a surface of the planar object.

6. The portable evaporative cooler for vehicles according to claim 1 wherein the airflow manifold comprises:
   an elongate first plate, the first plate extending from the bottom of the housing adjacent to the inlet to the top of the housing, the first plate being curvilinear; and
   an elongate second plate spaced from the first plate, the second plate extending from the bottom of the housing to a position midway towards the top of the housing, the first plate and the second plate defining a channel for directing airflow from the inlet through the first heat exchange system and the misting assembly towards the outlet, the fan being mounted within the channel.

7. The portable evaporative cooler for vehicles according to claim 1 wherein the nozzle is a spray nozzle oriented for directing the mist towards the outlet, and the misting assembly further comprises:
   a pipe coupled to the spray nozzle at one end, the pipe extending from the spray nozzle towards the front of the housing;
   a fluid tank disposed on the bottom of the housing near the front, the fluid tank storing fluid to be sprayed by the spray nozzle, the opposite end of the pipe being coupled to the fluid tank; and
   a pump coupled to the pipe, the pump being selectively operable by the controller to pump the fluid through the spray nozzle.

8. The portable evaporative cooler for vehicles according to claim 7, wherein the housing further comprises a tank access panel mounted to the front of the housing and at least one finger access groove adjacent the tank access panel, the tank access panel facilitating user access to the fluid tank for refills.

9. The portable evaporative cooler for vehicles according to claim 1, the further comprising:
a partition inside the housing, the partition having an opening to permit passage of the mixture towards the second heat exchange member; and
an absorbent layer covering the opening, the absorbent layer absorbing excess moisture from the mixture prior to the mixture passing through the second heat exchanger member.

10. The portable evaporative cooler for vehicles according to claim 1 wherein the control panel is mounted to the front of the housing, and further comprises:
a plurality of buttons disposed on the control panel, the buttons facilitating selective powering of the portable evaporative cooler and selective operation of the misting assembly and the fan;
at least one sensor mounted inside the airflow manifold, the at least one sensor detecting temperature and humidity of the ambient air, the at least one sensor being operatively coupled to the control panel;
a power source mounted inside the housing, the power source operatively coupled to the control panel, the fan, and the misting assembly; and
a plurality of indicator lights disposed on the control panel, the plurality of indicator lights displaying monitoring conditions of the portable evaporative cooler, each indicator light selectively lighting in response to a corresponding monitoring condition.

11. The portable evaporative cooler for vehicles according to claim 10, wherein the at least one sensor comprises a temperature sensor and a humidity sensor.

12. The portable evaporative cooler for vehicles according to claim 10, wherein the power source comprises a rechargeable battery.

13. The portable evaporative cooler for vehicles according to claim 12, further comprising a charging port mounted to a side of the housing.

14. The portable evaporative cooler for vehicles according to claim 11, further comprising:
a removable hinge attached to the mounting assembly; and
a solar panel detachably mounted to the removable hinge, the solar panel operatively coupled to the rechargeable battery to provide supplemental power to the rechargeable battery.

15. The portable evaporative cooler for vehicles according to claim 11, wherein each of the plurality of indicator light monitors one of the monitoring conditions selected from the group consisting of charging status of the rechargeable battery, a low battery power status, a high temperature status, and a high humidity status.

* * * * *